US007906237B2

United States Patent
Adachi et al.

(10) Patent No.: US 7,906,237 B2
(45) Date of Patent: *Mar. 15, 2011

(54) BATTERY

(75) Inventors: Momoe Adachi, Tokyo (JP); Shigeru Fujita, Tokyo (JP); Masahiro Aoki, Kanagawa (JP); Hiroyuki Akashi, Kanagawa (JP); Yoshiaki Naruse, Fukushima (JP)

(73) Assignee: Sony Corporation, Tokyo (JP)

( * ) Notice: Subject to any disclaimer, the term of this patent is extended or adjusted under 35 U.S.C. 154(b) by 1337 days.

This patent is subject to a terminal disclaimer.

(21) Appl. No.: 10/866,214

(22) Filed: Jun. 10, 2004

(65) Prior Publication Data
US 2005/0095503 A1 May 5, 2005

(30) Foreign Application Priority Data

Jun. 11, 2003 (JP) ................. P2003-166861
Dec. 12, 2003 (JP) ................. P2003-414622

(51) Int. Cl.
*H01M 4/58* (2010.01)
*H01M 6/04* (2006.01)
(52) U.S. Cl. ..................... 429/218.1; 429/188
(58) Field of Classification Search ............ 429/188, 429/218.1
See application file for complete search history.

(56) References Cited

U.S. PATENT DOCUMENTS

| 6,432,579 | B1 * | 8/2002 | Tsuji et al. ............ 429/218.1 |
| 6,693,212 | B1 | 2/2004 | Wietelmann et al. |
| 2002/0081496 | A1 * | 6/2002 | Tsujioka et al. ........... 429/307 |
| 2003/0148185 | A1 * | 8/2003 | Kusumoto et al. ......... 429/233 |
| 2004/0161670 | A1 * | 8/2004 | Kawase et al. ............. 429/245 |
| 2005/0053835 | A1 * | 3/2005 | Atsumi et al. ........... 429/218.1 |

FOREIGN PATENT DOCUMENTS

| JP | 03-137010 | 6/1991 |
| JP | 03-252053 | 11/1991 |
| JP | 06-325765 | 11/1994 |
| JP | 07-230800 | 8/1995 |
| JP | 2001-325989 | 11/2001 |
| JP | 2002-110235 | 4/2002 |
| JP | 2002-237294 | 8/2002 |
| JP | 2002-270156 | 9/2002 |
| JP | 2002-373703 | 12/2002 |
| JP | 2003-017069 | 1/2003 |
| JP | 2003-505464 | 2/2003 |
| JP | 2003-068358 | 3/2003 |

* cited by examiner

*Primary Examiner* — Patrick Ryan
*Assistant Examiner* — Muhammad Siddiquee
(74) *Attorney, Agent, or Firm* — K&L Gates LLP

(57) ABSTRACT

A battery is provided which has a high capacity and can improve battery characteristics, such as cycle characteristics. The battery includes a spirally wound electrode body, wherein a cathode and an anode are wound with a separator in between. The anode includes, for example, simple substances, alloys, compounds of metal elements or metalloid elements capable of forming an alloy with Li, the like and combinations thereof. An electrolytic solution wherein an electrolyte salt is dissolved in a solvent is impregnated in the separator. For the electrolyte salt, a light metallic salt having B—O bond or P—O bond, such as difluoro[oxalato-O,O'] lithium borate and tetra fluoro[oxalato-O,O']lithium phosphate, can be used. By forming a stable coating, decomposition reaction of the solvent can be inhibited, and reaction between the anode and the solvent can be prevented.

12 Claims, 2 Drawing Sheets

BATTERY

CROSS REFERENCES TO RELATED APPLICATIONS

This application claims priority to Japanese Patent Application Nos. P2003-166861 filed on Jun. 11, 2003, and P2003-414622 filed on Dec. 12, 2003, the disclosures of which are incorporated by reference herein.

BACKGROUND OF THE INVENTION

The present invention generally relates to a battery including a cathode, an anode, and an electrolyte.

In recent years, downsizing and weight saving of portable electronic devices typified by a mobile phone, a PDA (Personal Digital Assistant), and a laptop computer have been energetically made. As part of this situation, improvement of an energy density of a battery, particularly a secondary battery as a driving power source for these electronic devices has been strongly aspired.

As a secondary battery coverable of obtaining a high energy density, a battery, wherein a lithium alloy is used for an anode has been developed (for example, refer to Japanese Unexamined Patent Application Publication No. H06-325765 and Japanese Unexamined Patent Application Publication No. H07-230800).

However, there has been a problem that the lithium alloy is cracked into small pieces due to its intense expansion and shrinkage after repeating charge and discharge. Therefore, there has been a problem that when the lithium alloy is used for the anode, electronic conduction is lowered due to miniaturization from breaking of particles or reduced contact area between particles in the anode, and decomposition reaction of a solvent is improved due to increase of surface area, leading to insufficient cycle characteristics.

SUMMARY OF THE INVENTION

The present invention generally relates to a battery including a cathode, an anode, and an electrolyte.

The present invention provides a battery which has a high capacity and can improve battery characteristics, such as cycle characteristics.

According to an embodiment, the present invention includes a cathode; an anode; and an electrolyte, wherein the anode includes at least one anode active material, such as simple substances, alloys, and compounds of metal elements and simple substances, alloys, and compounds of metalloid elements, a capacity of the anode includes a capacity component derived from inserting and extracting a light metal by the anode active material, and the electrolyte includes a light metallic salt having M-X bond where M represents a transition metal element or a 3B Group element, a 4B Group element, or a 5B Group element in the short-period periodic table; and X represents oxygen (O), sulfur (S) or the like.

According to another embodiment, the present invention includes a cathode; an anode; and an electrolyte, wherein the anode includes an anode current collector, and an anode active material layer which is provided on the anode current collector and alloyed with the anode current collector at least on part of an interface with the anode current collector, and the electrolyte includes a light metallic salt having M-X bond where M represents a transition metal element or a 3B Group element, a 4B Group element, or a 5B Group element in the short-period periodic table; and X represents oxygen, sulfur or the like.

According to yet another embodiment, the present invention includes a cathode; an anode; and an electrolyte, wherein the anode includes an anode current collector, and an anode active material layer which is formed on the anode current collector by at least one method, such as vapor-phase deposition method, liquid-phase deposition method, sintering method, and the like and the electrolyte includes a light metallic salt having M-X bond where M represents a transition metal element or a 3B Group element, a 4B Group element, or a 5B Group element in the short-period periodic table; and X represents oxygen, sulfur or the like.

According to an embodiment of the present invention, the electrolyte includes the light metallic salt having M-X bond. Therefore, decomposition reaction of the electrolyte can be inhibited even in the following cases, for example, where the anode includes at least one anode active material such as simple substances, alloys, and compounds of metal elements and simple substances, alloys, and compounds of metalloid elements, and a capacity of the anode includes a capacity component derived from inserting and extracting a light metal by the anode active material; where the anode has an anode active material layer which is alloyed with the anode current collector at least on part of an interface with the anode current collector; and where the anode has an anode active material layer which is formed by at least one method from the group consisting of vapor-phase deposition method, liquid-phase deposition method, and sintering method. In addition, reaction between the anode and the electrolyte can be prevented. Consequently, high capacity can be obtained, charge and discharge efficiency can be improved, and various characteristics such as cycle characteristics can be improved.

In particular, when a light metallic salt having B—O bond or P—O bond is included, more particularly when a light metallic salt having O—B—O bond or O—P—O bond is included, higher efficiency can be obtained according to an embodiment.

Further, when other light metallic salt is included in addition to the light metallic salt having M-X bond, internal resistance can be lowered, and battery characteristics such as heavy load characteristics can be improved.

Additional features and advantages of the present invention are described in, and will be apparent from, the following Detailed Description of the Invention and the figures.

DETAILED DESCRIPTION OF THE INVENTION

The present invention generally relates to a battery including a cathode, an anode, and an electrolyte.

Various embodiments of the present invention will be described in detail hereinbelow with reference to the drawings without limitation to the scope of the present invention.

Figure 1:
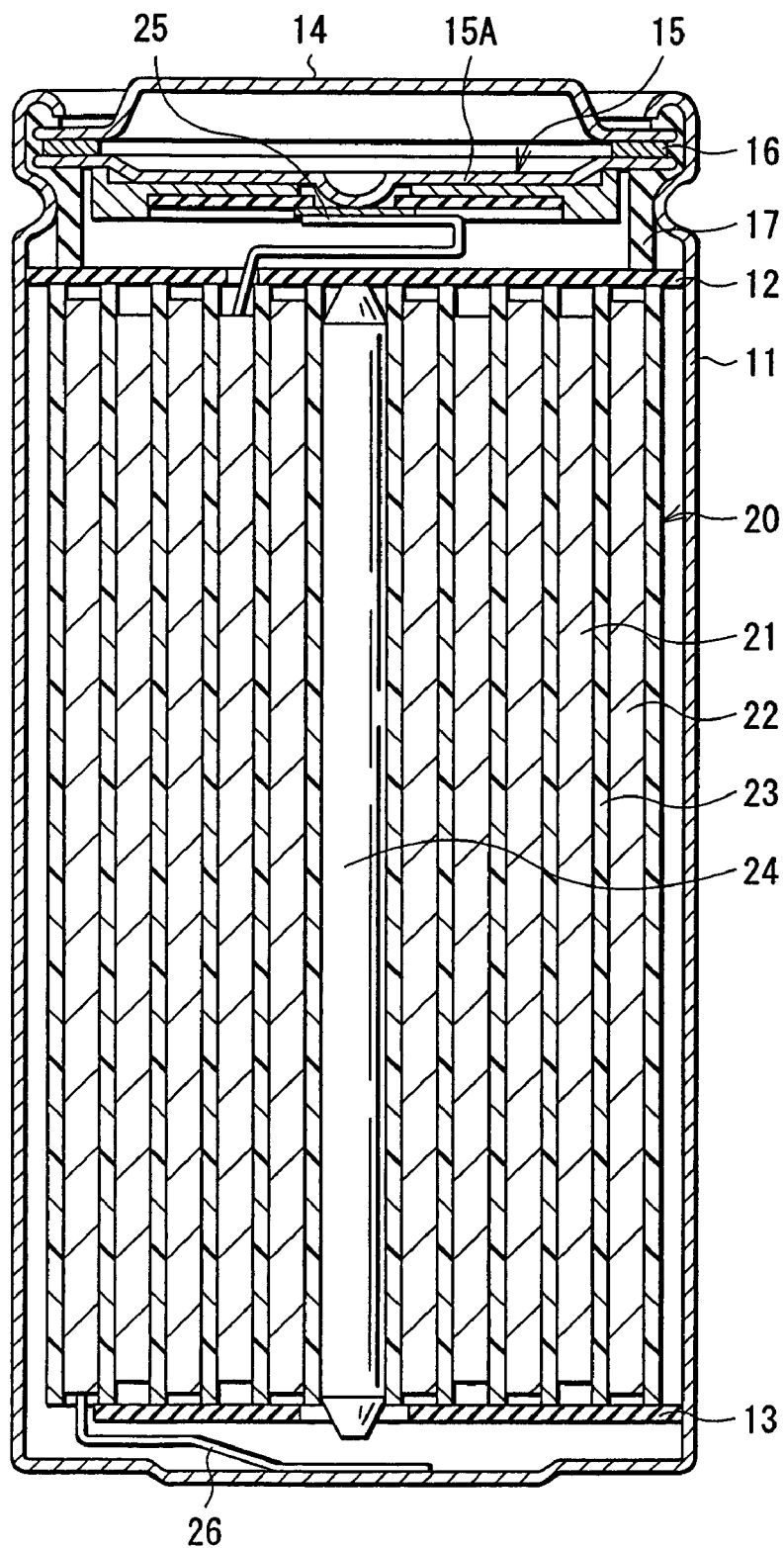
FIG. 1 is a cross sectional view, which shows a construction of a secondary battery according to an embodiment of the invention.

FIG. 1 shows a cross sectional structure of a secondary battery according to the embodiment of the invention. This secondary battery is a so-called cylinder type battery, and includes a spirally wound electrode body 20 wherein a strip-shaped cathode 21 and a strip-shaped anode 22 are wound with a separator 23 in between inside a battery can 11 in the shape of an approximately hollow cylinder. The battery can 11 is made of, for example, iron (Fe) plated by nickel (Ni) and the like. One end of the battery can 11 is closed, and the other end of the battery can 11 is opened. Inside the battery can 11, a pair of insulating plates 12 and 13 are respectively arranged so that the spirally wound electrode body 20 is sandwiched between the insulating plates 12 and 13, and the insulating plates 12 and 13 are located perpendicular to the winding periphery face.

At the open end of the battery can 11, a battery cover 14 and a safety valve mechanism 15 and a PTC device (Positive Temperature Coefficient device) 16 provided inside the battery cover 14 are mounted through caulking by a gasket 17. Inside of the battery can 11 is closed. The battery cover 14 is, for example, made of a material similar to that of the battery can 11. The safety valve mechanism 15 is electrically connected to the battery cover 14 through the PTC device 16. When an inner pressure of the battery becomes a certain level or more by internal short circuit or exterior heating, a disk plate 15A flips to cut the electrical connection between the battery cover 14 and the electrode winding body 20. When a temperature rises, the PTC device 16 limits a current by increasing its resistance value to prevent abnormal heat generation by a large current. The gasket 17 is made of, for example, an insulating material and its surface is coated with asphalt.

The spirally wound electrode body 20 is wound around, for example, a center pin 24. A cathode lead 25 made of aluminum or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
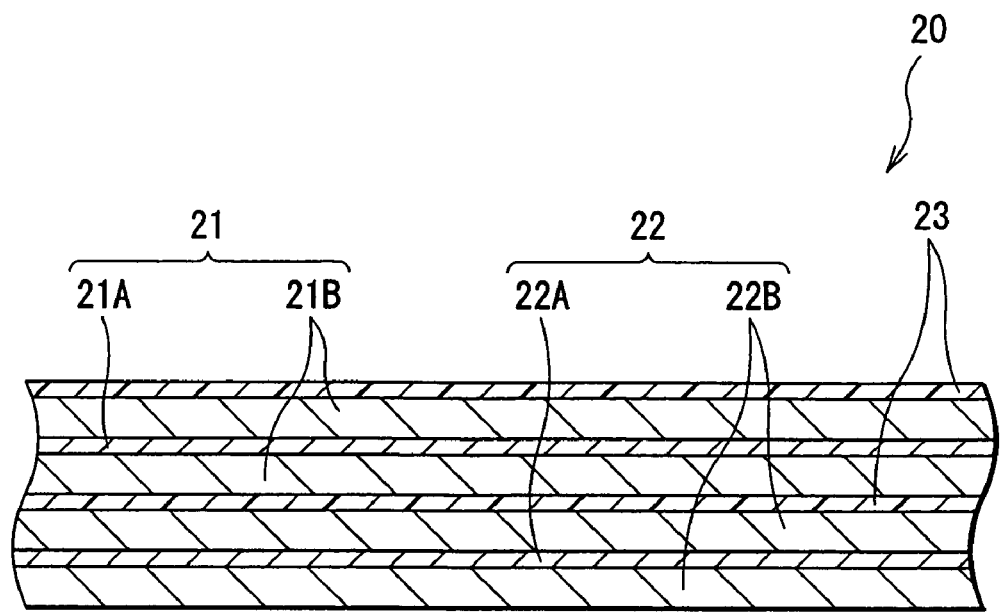
FIG. 2 is an enlarged cross sectional view of part of a spirally wound electrode body in the secondary battery shown in FIG. 1.

FIG. 2 is an enlarged view of part of the spirally wound electrode body 20 shown in FIG. 1. The cathode 21 includes, for example, a cathode current collector 21A having a pair of facing faces and cathode active material layer 21B provided on both sides or on a single side of the cathode current collector 21A. The cathode current collector 21A is made of, for example, a metal foil such as an aluminum foil, a nickel foil, a stainless foil and the like. The cathode active material layer 21B contains, for example, a cathode material capable of inserting and extracting lithium as a cathode active material.

As a cathode material capable of inserting and extracting lithium, a lithium-containing compound, which contains lithium, a transition metal element, and oxygen is preferably contained in order to improve an energy density. Specially, it is more preferable to contain a lithium-containing compound which contains, for example, cobalt (Co), nickel, manganese (Mn) as a transition metal and the like. Examples of such a lithium-containing compound include, for example, $LiCoO_2$, $LiNiCoO_2$, and the like.

The foregoing cathode material is prepared by mixing a carbonate, a nitrate, an oxide, a hydroxide of lithium or the like; and a carbonate, a nitrate, an oxide, a hydroxide of a transition metal or the like so as to obtain a desired composition, pulverizing the mixture, and firing the resultant at a temperature within the range of about 600° C. to about 1000° C. in oxygen atmosphere.

The cathode active material layer 21B contains, for example, a conductive agent. The cathode active material layer 21B can further contain a binder as necessary. Examples of the conductive agent include carbon materials such as graphite, carbon black, Ketjen black and the like. One of them or a mixture of two or more of them is used. In addition to the carbon materials, a metal material or a conductive high molecular weight material can be used as long as the material has conductivity. Examples of the binder include synthetic rubber such as styrene butadiene rubber, fluorinated rubber, ethylene propylene diene rubber and the like; and high molecular weight materials such as polyvinylidene fluoride and the like. One of them or a mixture of two or more of them is used. For example, as shown in FIG. 1, when the cathode 21 and the anode 22 are wound, as a binder, flexible styrene butadiene rubber, fluorinated rubber or the like is preferably used.

The anode 22 includes, for example, an anode current collector 22A having a pair of facing faces and anode active material layer 22B provided on both sides or on a single side of the anode current collector 22A. The anode current collector 22A is preferably made of, for example, copper (Cu), stainless, nickel, titanium (Ti), tungsten (W), molybdenum (Mo), aluminum alloys thereof and the like. Specially, in some cases, the anode current collector 22A is more preferably made of a metal easy to be alloyed with the anode active material layer 22B. For example, as described later, when the anode active material layer 22B contains, for example, simple substances, alloys, and compounds of silicon (Si) and tin (Sn), copper, titanium, aluminum, and nickel can be utilized as a material that can be readily alloyed with the anode active material layer 22B. Though the anode current collector 22A can be constructed by a single layer, it can be also constructed by several layers. In this case, it is possible that a layer contacting with the anode active material layer 22B is made of the metal material easy to be alloyed with the anode active material layer 22B, and other layers are made of other metal material.

When the anode active material layer 22B is formed by vapor-phase deposition method, liquid-phase deposition method, sintering method, or a combination thereof as described later, or when at least part of the interface between the anode current collector 22A and the anode active material layer 22B is alloyed, a surface roughness of the anode current collector 22A is preferably about 0.1 μm or more by arithmetic average roughness Ra. The reason thereof is that a shape of fracture raised by expansion and shrinkage of the anode active material layer 22 in accordance with charge and discharge can be controlled, and a stress is dispersed so that structure destruction of the anode 22 can be inhibited.

The anode active material layer 22B includes, for example, simple substances, alloys, and compounds of metal elements capable of forming an alloy with lithium; and simple substances, alloys, and compounds of metalloid elements capable of forming an alloy with lithium as an anode active material and the like. Therefore, a capacity of the anode 22 includes a capacity component derived from inserting and extracting lithium by the anode active material. Consequently, a high energy density can be obtained.

Examples of such metal elements or the metalloid elements include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) hafnium (Hf) and the like. Examples of compounds thereof include ones which are expressed by a chemical formula of $M\alpha_{s1}M\beta_{s2}Li_{s3}$, or a chemical formula of $M\alpha_{s4}M\gamma_{s5}M\delta_{s6}$. In these chemical formulas, Mα represents at least one of metal elements and metalloid elements capable of forming an alloy with lithium, and Mβ represents at least one of metal elements and metalloid elements other than lithium and Mα. Mγ represents at least one of nonmetallic elements, and Mδ represents at least one of metal elements and metalloid elements other than Mα. Values of s1, s2, s3, s4, s5, and s6 include s1>0, s2>0, s3>0, s4>0, s5>0, and s6>0, respectively, in an embodiment.

Specially, simple substances, alloys, or compounds of metal elements or metalloid elements in Group 4B in the short-period periodic table are preferable. Simple substances, alloys, or compounds of silicon and tin are particularly preferable, since their ability to insert and extract lithium is high, and they can improve an energy density of the anode 22 compared to conventional graphite depending on applied combination. These materials can be crystalline or amorphous.

Specific examples of such compounds include LiAl, AlSb, $CuMgSb$, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO, LiSnO and the like.

The anode active material layer 22B is preferably formed by at least one method, such as vapor-phase deposition method, liquid-phase deposition method, sintering method and the like. These methods are preferable, since destruction due to expansion and shrinkage of the anode active material layer 22B in accordance with charge and discharge can be inhibited, the anode current collector 22A and the anode active material layer 22B can be unified, and an electronic conductivity in the anode active material layer 22B can be improved. Further, these methods are preferable since a binder, voids and so on can be reduced or excluded, and the anode 22 can become a thin film.

It is preferable that the anode active material layer 22B is alloyed with the anode current collector 22A at least on part of the interface with the anode current collector 22A. More specifically, it is preferable that on the interface, component elements of the anode current collector 22A are diffused into the anode active material layer 22B, or component elements of the anode active material are diffused into the anode current collector 22A, or component elements of both the anode current collector 22A and the anode active material layer 22B are diffused into each other. This alloying often arises concurrently with forming the anode active material layer 22B by vapor-phase deposition method, liquid-phase deposition method, or sintering method. However, the alloying can be caused by further heat treatment, or in initial charge.

The anode active material layer 22B can be formed by coating as well. Specifically, the anode active material layer 22B can contain powders of the anode active material and a binder such as polyvinylidene fluoride and the like as necessary. In this case, the anode active material layer 22B can contain other anode active material in addition to at least one from the group consisting of simple substances, alloys, and compounds of metal elements or metalloid elements capable of forming an alloy with lithium. As other anode active material, carbon materials such as graphite, non-graphitizable carbon, and graphitizable carbon are preferable. When using these carbon materials, change in crystal structure raised in charge and discharge is very small. Therefore, when these carbon materials are contained in addition to a simple substance, an alloy, or a compound of metal elements or metalloid elements capable of forming an alloy with lithium, a high energy density can be obtained, and excellent cycle characteristics can be obtained.

Graphite having a true density of, for example, 2.10 g/cm³ or over is preferable, and one having a true density of 2.18 g/cm³ or over is more preferable. In order to obtain such true density, it is necessary that a thickness of C axis crystal on (002) plane is 14.0 nm or more. Face distance of the (002) plane is preferably less than 0.340 nm, and more preferably within the range of 0.335 nm to 0.337 nm.

Graphite can be either natural graphite or artificial graphite. The artificial graphite can be obtained by, for example, carbonizing an organic material, performing high temperature heat treatment, pulverizing and classifying the resultant. The high temperature heat treatment is performed, for example, by carbonizing an organic material at about 300° C. to about 700° C. in air currents of inert gas such as nitrogen ($N_2$) as necessary, raising temperature up to about 900° C. to about 1500° C. at a rate of about 1° C. to about 100° C. per minute, maintaining such temperature for about 0 to about 30 hours, firing, heating up to about 2000° C. or higher, preferably about 2500° C. or higher, and maintaining the temperature for appropriate time.

As an organic material of a starting material, carbon or pitch can be used. Examples of the pitch include a material which is obtained by distillation, such as vacuum distillation, atmospheric distillation, steam distillation, thermal polycondensation, extraction, and chemical polycondensation of tars, obtained by thermally decomposing coal tar, ethylene bottom oil, crude oil or the like at high temperatures, asphalt or the like, a material produced during destructive distillation of wood, a polyvinyl chloride resin, polyvinyl acetate, polyvinyl butyrate, or a 3,5-dimethylphenol resin. Such coals and pitches exist in a liquid state in the middle of carbonization at up to about 400° C. When maintained at such temperature, aromatic rings condense with each other, turn polycyclic, and their orientation becomes lamination. After that, at about 500° C. or higher, a solid carbon precursor, that is semicoke is obtained such as by a liquid phase carbonization process.

As an organic material, condensation polycyclic hydrocarbon compounds such as naphthalene, phenanthrene, anthracene, triphenylene, pyrene, perylene, pentaphene, pentacene; their derivatives, for example, carboxylic acid, carboxylic anhydride, and carboxylic acid imide of the foregoing compounds, or mixtures thereof can be used. Further, condensation heterocyclic compound such as acenaphthylene, indole, isoindole, quinoline, isoquinoline, quinoxaline, phthaladine, carbazole, acridine, phenazine, and phenantolidine, their derivatives, or mixtures thereof can be also used.

Pulverization can be performed either before and after carbonization or calcination, or during a rise in temperature before graphitization. In these cases, heat treatment for graphitization is performed in powder state finally. However, in order to obtain graphite powders having a high bulk density and a high breaking strength, it is preferable that a raw material is firstly molded, heat treatment is subsequently performed, and then the obtained graphitized molded body is pulverized and classified.

For example, when the graphitized molded body is formed, cokes of a filler and binder pitch of a molding agent or a sintering agent are mixed and molded. After that, a firing process wherein heat treatment is performed for the molded body at low temperatures of 1,000° C. or below, and a pitch impregnation process wherein the melted binder pitch is impregnated in the fired body are repeated several times. Then, heat treatment is performed at high temperatures. In the foregoing heat treatment process, the impregnated binder pitch is carbonized and graphitized. In this case, raw materials are the filler (cokes) and the binder pitch. Therefore, graphitization proceeds as a polycrystalline body. Further, sulfur and nitrogen contained in the raw materials are generated as gas in the heat treatment. Therefore, fine vacancies are formed at their path. Consequently, these vacancies allow insertion and extraction reaction of lithium to proceed easily, and make process efficiency high industrially. As a raw material for the molded body, a filler having molding characteristics and sintering characteristics in itself can be used as well. In this case, it is not necessary to use the binder pitch.

The non-graphitizable carbon whose face distance of the (002) plane is 0.37 nm or more, whose true density is less than 1.70 g/cm$^3$, and which does not show an exothermic peak at 700° C. or more in differential thermal analysis (DTA) in the air is preferable.

Such non-graphitizable carbon can be obtained by, for example, providing an organic material with heat treatment at about 1200° C., pulverizing and classifying the resultant. The heat treatment is performed, for example, by carbonizing the organic material at about 300° C. to about 700° C. (solid phase carbonization process), raising temperature up to about 900° C. to about 1300° C. at a rate of about 1° C. to about 100° C. per minute, and maintaining such temperature for about 0 to 30 hours. Pulverization can be performed either before and after carbonization or during a rise in temperature.

As an organic material of a starting material, for example, a polymer and a copolymer of furfuryl alcohol or furfural, or a furan resin, which a copolymer of these macromolecules and other resin can be used. Conjugated resins such as a phenol resin, an acrylate resin, a vinyl halide resin, a polyimide resin, a polyamideimide resin, a polyamide resin, polyacetylene, polyparaphenylene or the like; cellulose or its derivatives; coffee beans; bamboo; crustacea containing chitosan; biocellulose utilizing bacteria can be also used. A compound wherein a functional group containing oxygen is introduced into petroleum pitch whose atomicity ratio H/C between hydrogen atom (H) and carbon atom (C) is, for example, 0.6 to 0.8 (so-called oxygen cross-linking) can be also used.

Content percentage of oxygen in this compound is preferably about 3% or more, and more preferably about 5% or more (refer to Japanese Unexamined Patent Application Publication No. H03-252053). A content percentage of oxygen affects a crystal structure of a carbon material. Therefore, when a content percentage of oxygen is the foregoing percentage or more, physical properties of the non-graphitizable carbon can be improved, and a capacity of the anode 22 can be improved. The petroleum pitch can be obtained by, for example, distillation (vacuum distillation, atmospheric distillation, or steam distillation), thermal polycondensation, extraction, or chemical polycondensation of tars obtained by thermally decomposing coal tar, ethylene bottom oil, crude oil or the like at high temperatures, asphalt or the like. As a method for forming oxygen cross-link, for example, wet process to react an aqueous solution such as nitric acid, sulfuric acid, hypochlorous acid, and mixed acid thereof with petroleum pitch; dry method to react oxidizing gas such as air and oxygen with petroleum pitch; or a method to react a solid reagent such as sulfur, ammonium nitrate, persulfate ammonia, and ferric chloride with petroleum pitch can be used.

An organic material of a starting material is not limited to the foregoing. Other organic materials can be used as long as they can become non-graphitizable carbon through the solid phase carbonization process by oxygen cross-linking or the like.

As a non-graphitizable carbon, in addition to non-graphitizable carbon formed of the foregoing organic material as a starting material, a compound whose main components are phosphorous, oxygen, and carbon, described in Japanese Unexamined Patent Application Publication No. H03-137010 is preferable since it shows the above-mentioned physical property parameters.

The separator 23 is constructed of, for example, a porous film made of a synthetic resin of polytetrafluoro ethylene, polypropylene, polyethylene or the like or a porous film made of ceramics. The separator 23 can have a structure in which two or more of the foregoing porous films are layered. Specially, the porous film made of polyolefin is preferable since it has an excellent short circuit prevention effect, and has ability to improve battery safety by shutdown effect. In particular, polyethylene is preferable since it has ability to obtain shutdown effect within the range of about 100° C. to about 160° C., and it has excellent electrochemical stability. In addition, polypropylene is preferable. It is possible to use other resin with chemical stability by copolymerizing with polyethylene or polypropylene, or blending them.

An electrolytic solution, which is a liquid electrolyte, is impregnated in the separator 23. The electrolytic solution contains, for example, a liquid solvent such as a nonaqueous solvent, for example, an organic solvent, and an electrolyte salt dissolved in the nonaqueous solvent. The electrolytic solution also contains various additives as necessary. The liquid nonaqueous solvent is made of, for example, a non-aqueous compound, having an intrinsic viscosity of 10.0 mPa·s or less at 25° C. The liquid nonaqueous solvent having an intrinsic viscosity of 10.0 mPa·s or less when the electrolyte salt is dissolved can be also used. When a solvent is prepared by mixing several kinds of nonaqueous compounds, the solvent having an intrinsic viscosity of 10.0 mPa·s or less in mixed state can be used.

As such a nonaqueous solvent, various conventionally used nonaqueous solvents can be used. Concrete examples of the nonaqueous solvent include cyclic carbonic acid ester such as propylene carbonate and ethylene carbonate; chain ester such as diethyl carbonate, dimethyl carbonate, and ethyl methyl carbonate; and ethers such as y-butyrolactone, sulfolane, 2-methyl tetrahydrofuran, dimethoxy ethane and the like. These materials can be used by themselves, or a mixture of several kinds of them can be used. Specifically, in view of oxidation stability, it is preferable to include carbonic acid ester.

An electrolyte salt preferably includes one or more light metallic salt having M-X bond where M represents a transition metal element or a 3B Group element, a 4B Group element, or a 5B Group element in the short-period periodic table; and X represents oxygen or sulfur. It is thought that such a light metallic salt can form a stable coating on the surface of the anode 22, inhibit decomposition reaction of the solvent in the anode 22, and prevent reaction between the anode 22 and the solvent.

Specially, the cyclic compound is preferable. It is thought that cyclic parts also relate to coating formation, so that a stable coating can be obtained.

As such a light metallic salt, for example, a compound expressed by Chemical formula 1 can be utilized.

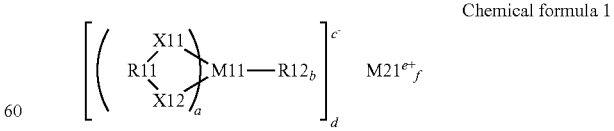

Chemical formula 1

In Chemical formula 1, R11 represents a group expressed by Chemical formula 2 or Chemical formula 3 described below. R12 represents halogen, an alkyl group, a halogenated alkyl group, an aryl group, or a halogenated aryl group. X11 and X12 represent oxygen and sulfur, respectively. M11 represents a transition metal element or a 3B Group element, a 4B Group element, or a 5B Group element in the short-period periodic table. M21 represents a 1A Group element, or a 2A Group element in the short-period periodic table or aluminum. a is an integer number of 1 to 4, b is an integer number of 0 to 8, and c, d, e, and f are integer numbers of 1 to 3, respectively.

Chemical formula 2

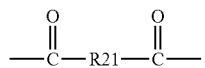

R21 represents an alkylene group, a halogenated alkylene group, an arylene group, or a halogenated arylene group.

Chemical formula 3

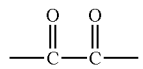

Specifically, a compound expressed by Chemical formula 4 can be utilized.

Chemical formula 4

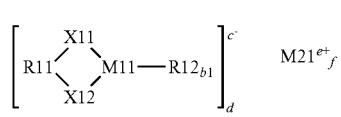

In Chemical formula 4, R11 represents a group expressed by Chemical formula 2 or Chemical formula 3. R12 represents halogen, an alkyl group, a halogenated alkyl group, an aryl group, or a halogenated aryl group. X11 and X12 represent oxygen and sulfur, respectively. M11 represents a transition metal element or a 3B Group element, a 4B Group element, or a 5B Group element in the short-period periodic table. M21 represents a 1A Group element, or a 2A Group element in the short-period periodic table or aluminum. b1 is an integer number of 1 to 8, and c, d, e, and f are integer numbers of 1 to 3, respectively.

Specially, a compound expressed by Chemical formula 5 is preferable as shown below.

Chemical formula 5

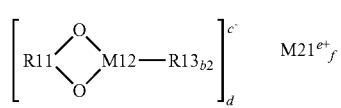

In Chemical formula 5, R11 represents a group expressed by Chemical formula 2 or Chemical formula 3. R13 represents halogen. M12 represents phosphorous (P) or boron (B). M21 represents a 1A Group element, or a 2A Group element in the short-period periodic table or aluminum. b2 is 2 or 4, and c, d, e, and f are integer numbers of 1 to 3, respectively.

More specifically, difluoro[oxalato-O,O']lithium borate expressed by Chemical formula 6 described below, or tetra fluoro[oxalato-O,O']lithium phosphate expressed by Chemical formula 7 described below is preferable. The compound having B—O bond or P—O bond can provide higher effects, particularly the compound having O—B—O bond or O—P—O bond can provide even higher effects.

Chemical formula 6

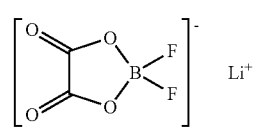

Chemical formula 7

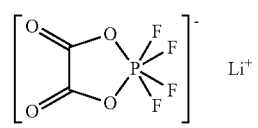

Further, bis[oxalato-O,O']lithium borate expressed by Chemical formula 8 described below, difluorodi[oxalato-O,O']lithium phosphate expressed by Chemical formula 9 described below, or tris[oxalato-O,O']lithium phosphate expressed by Chemical formula 10 described below is preferable. They are compounds which are derived from Chemical formula 1, in the case that an integer number a of Chemical formula 1 is 2 or 3. As Chemical formulas 6 and 7, they have O—B—O bond or O—P—O bond, so that they can provide higher effects.

Chemical formula 8

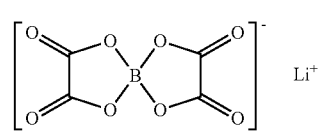

Chemical formula 9

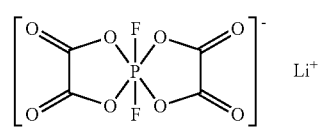

Chemical formula 10

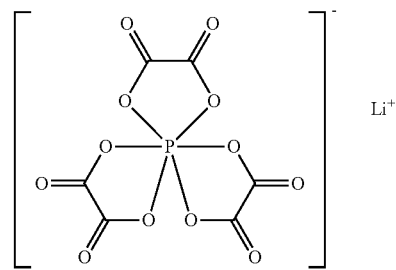

As a lithium salt having M-X bond, in addition to the foregoing, bis[1,2-benzene diorate (2-)-O,O']lithium borate expressed by Chemical formula 11 described above, and tris[1,2-benzene diorate (2-)-O,O']lithium phosphate expressed by Chemical formula 12 described above are also preferable for the same reason as above.

Chemical formula 11

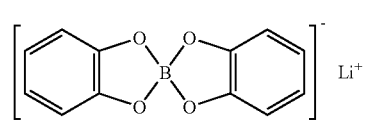

Chemical formula 12

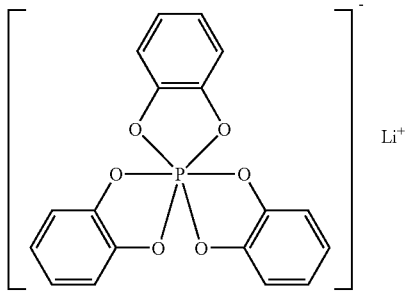

Further, it is preferable that the electrolyte salt contains one or more other light metallic salt in addition to the light metallic salt having M-X bond. The reason thereof is that internal resistance can be reduced, and battery characteristics such as heavy load characteristics can be improved. Other light metallic salts include a lithium salt expressed by Chemical formula 13 described above such as LiB ($C_6H_5$)$_4$, LiCH$_3$SO$_3$, LiCF$_3$SO$_3$, LiAlCl$_4$, LiSiF$_6$, LiCl, LiBr, LiPF$_6$, LiBF$_4$, LiClO$_4$, LiAsF$_6$, LiN(CF$_3$SO$_2$)$_2$, LiN(C$_2$F$_5$SO$_2$)$_2$, and LiN(C$_4$F$_9$SO$_2$)(CF$_3$SO$_2$), and a lithium salt expressed by Chemical formula 14 described above such as LiC(CF$_3$SO$_2$)$_3$.

$$LiN(C_mF_{2m+1}SO_2)(C_nF_{2n+1}SO_2)$$ Chemical formula 13

In Chemical formula 13, m and n are integer numbers of 1 or over.

$$LiC(C_pF_{2p+1}SO_2)(C_qF_{2q+1}SO_2)(C_rF_{2r+1}SO_2)$$ Chemical formula 14

In Chemical formula 14, p, q, and r are integer numbers of 1 or over.

In particular, when at least one type of compound, such as LiPF$_6$, LiBF$_4$, LiClO$_4$, LiAsF$_6$, a lithium salt expressed by Chemical formula 13, and a lithium salt expressed by Chemical formula 14 is preferably contained, higher effects and a high conductivity can be obtained. In an embodiment, it is particularly preferable to include LiPF$_6$.

The content (density) of the electrolyte salt in relation to the solvent is preferably within the range from about 0.3 mol/kg to about 3.0 mol/kg. If out of this range, there is the possibility that sufficient battery characteristics cannot be obtained due to extreme decrease of ion conductivity. The content of the light metallic salt having M-X bond is preferably within the range from about 0.01 mol/kg to about 2.0 mol/kg in relation to the solvent. In this range, higher effects can be obtained.

Instead of the electrolytic solution, a gelatinous electrolyte wherein an electrolytic solution is held in a high molecular weight compound can be used. As long as the gelatinous electrolyte has an ion conductivity of about 1 mS/cm or more at room temperatures, its composition and structure of the high molecular weight compound are not particularly limited. The electrolytic solution (that is, a liquid solvent, an electrolyte salt and an additive) is as mentioned above. Examples of the high molecular weight compound include poly acrylic nitrile, polyvinylidene fluoride, a copolymer of polyvinylidene fluoride and poly hexafluoro propylene, poly tetra fluoro ethylene, poly hexafluoro propylene, polyethylene oxide, poly propylene oxide, poly phosphagen, poly siloxane, polyvinyl acetate, polyvinyl alcohol, polymethacrylic acid methyl, polyacrylic acid, polymethacrylic acid, styrene-butadiene rubber, nitrile-butadiene rubber, polystyrene, poly carbonate and the like. In view of electrochemical stability, a high molecular weight compound having a structure of poly acrylic nitrile, polyvinylidene fluoride, poly hexafluoro propylene, or polyethylene oxide is desirable in an embodiment. Generally, an additive amount of the high molecular weight compound in relation to the electrolytic solution is preferably from about 30 wt % to about 50 wt % of the electrolytic solution, though depending on compatibility therebetween.

The content of the electrolyte salt is similar to the case of the electrolytic solution. However, here, the solvent does not mean only a liquid solvent. The solvent widely covers ones which can disassociate the electrolyte salt, and has ion conductivity. Therefore, when a high molecular weight compound having the ion conductivity is used, this high molecular weight compound is also included in the solvent.

This secondary battery can be manufactured as follows, for example.

First, for example, the cathode 21 is fabricated by forming the cathode active material layer 21B on the cathode current collector 21A. For example, the cathode active material layer 21B is formed as follows. First, a cathode active material powders, a conductive agent, and a binder are mixed to prepare a cathode mixture. This cathode mixture is dispersed in a solvent such as N-methyl-2-pyrrolidone to obtain a cathode mixture slurry in paste form. Next, this cathode mixture slurry is applied to the cathode current collector 21A, dried, and compression-molded to form the cathode active material layer 21B.

Further, for example, the anode 22 is fabricated by forming the anode active material layer 22B on the anode current collector 22A. For example, the anode active material layer 22B is formed by depositing the anode active material on the anode current collector 22A by using vapor-phase deposition method or liquid-phase deposition method. Furthermore, the anode active material layer 22B can be formed by sintering method, wherein a precursor layer containing a particulate anode active material is formed on the anode current collector 22A, and then sintered. The anode active material layer 22B can be formed by combining two or three methods from vapor-phase deposition method, liquid-phase deposition method, and sintering method. In some cases, by forming the anode active material layer 22B by using at least one method from the group consisting of vapor-phase deposition method, liquid-phase deposition method, and sintering method, the anode active material layer 22B whose at least part of interface with the anode current collector 22A is alloyed with the anode current collector 22A can be formed.

In order to further alloy the interface between the anode current collector 22A and the anode active material layer 22B, it is possible to additionally perform heat treatment under vacuum atmosphere or non-oxidizing atmosphere. In particular, when the anode active material layer 22B is formed by plating as described later, the anode active material layer 22B may be hard to be alloyed even on the interface with the anode current collector 22A. Therefore, in this case, this heat treatment is preferably performed as necessary. Further, when the anode active material layer 22B is formed by vapor-phase deposition method, further alloying the interface between the anode current collector 22A and the anode active material layer 22B may also improve the characteristics. Therefore, in this case, this heat treatment is also preferably performed as necessary.

As vapor-phase deposition method, for example, physical deposition method or chemical deposition method can be used. More specifically, vacuum deposition method, sputtering method, ion plating method, laser ablation method, thermal CVD (chemical vapor deposition) method, plasma CVD method or the like can be utilized. As liquid-phase deposition method, known methods such as electrolytic plating and electroless plating can be utilized. Regarding sintering method, known methods can be utilized. For example, atmospheric sintering method, reaction sintering method, and hot press sintering method can be utilized.

The anode active material layer 22B can be formed by coating as well. An example of the concrete method is as follows. First, an anode active material powders and a binder are mixed to prepare an anode mixture. This anode mixture is dispersed in a solvent such as N-methyl-2-pyrrolidone to obtain an anode mixture slurry in paste form. Next, this anode mixture slurry is applied to the anode current collector 22A, dried, and compression-molded to form the anode active material layer 22B. However, the anode active material layer 22B is more preferably formed by at least one method, such as vapor-phase deposition method, liquid-phase deposition method, and sintering method. The reason thereof is that adhesion between the anode current collector 22A and the anode active material layer 22B can be improved, and alloying between the anode current collector 22A and the anode active material layer 22B often proceeds concurrently with formation of the anode active material layer 22B.

Subsequently, the cathode lead 25 is attached on the cathode current collector 21A by welding or the like and the anode lead 26 is attached on the anode current collector 22A by welding or the like. After that, the cathode 21 and the anode 22 are wound with the separator 23 in between. An end of the cathode lead 25 is welded to the safety valve mechanism 15, and an end of the anode lead 26 is welded to the battery can 11. The wound cathode 21 and anode 22 are sandwiched between the pair of insulating plates 12 and 13, and the cathode 21 and the anode 22 are housed inside the battery can 11. After housing the cathode 21 and the anode 22 inside the battery can 11, an electrolyte is injected into the battery can 11, and impregnated in the separator 23. After that, at the open end of the battery can 11, the battery cover 14, the safety valve mechanism 15, and the PTC device 16 are fixed through caulking by the gasket 17. The secondary battery shown in FIG. 1 is thereby completed.

In this secondary battery, when charged, for example, lithium ions are extracted from the cathode 21, and are inserted in the anode 22 through the electrolyte. When discharged, for example, lithium ions are extracted from the anode 22, and are inserted in the cathode 21 through the electrolyte. In this regard, a stable coating is formed on the surface of the anode 22 by the light metallic salt having M-X bond, and decomposition reaction of the solvent is inhibited. In addition, reaction between the anode 22 and the solvent can be prevented.

As above, according to this embodiment, the electrolyte contains the light metallic salt having M-X bond. Therefore, even when the anode 22 includes at least one type of material, such as simple substances, alloys, and compounds of metal elements or metalloid elements capable of forming an alloy with lithium, decomposition reaction of the solvent in the anode 22 can be inhibited. Further, reaction between the anode 22 and the solvent can be prevented. Consequently, a high capacity can be obtained, charge and discharge efficiency can be improved, and various characteristics such as cycle characteristics can be improved.

In particular, when the light metallic salt having B—O bond or P—O bond is included, or more particularly, when the light metallic salt having O—B—O bond or O—P—O bond is included, higher effects can be obtained.

When other light metallic salt is included in addition to the light metallic salt having M-X bond, internal resistance can be reduced, and battery characteristics such as heavy load characteristics can be improved. Further, when $LiPF_6$ is included in addition to the light metallic salt having M-X bond, conductivity can be improved, and battery characteristics such as cycle characteristics can be improved.

Examples illustrative of the present invention will now be described in detail with reference to the drawings without limitation to the scope of the present invention.

EXAMPLES 1-1 TO 1-18

Cylindrical secondary batteries shown in FIGS. 1 and 2 were fabricated as follows. First, lithium carbonate ($Li_2CO_3$) and cobalt carbonate ($CoCO_3$) were mixed at a ratio (molar ratio) of $Li_2CO_3:CoCO_3=0.5:1$. The mixture was fired for 5 hours at 900° C. in the air to obtain lithium cobalt complex oxide ($LiCoO_2$) as a cathode active material. Next, 91 parts by mass of lithium cobalt complex oxide, 6 parts by mass of graphite as a conductive agent, and 3 parts by mass of polyvinylidene fluoride as a binder were mixed to prepare a cathode mixture. Subsequently, this cathode mixture was dispersed in N-methyl-2-pyrrolidone of a solvent to obtain a cathode mixture slurry. This cathode mixture slurry was uniformly applied on both sides of the cathode current collector 21A made of a strip shaped aluminum foil having a thickness of 20 μm, dried, and compression-molded to form the cathode active material layer 21B. Then, the resultant was cut in the shape of a strip to form the strip shaped cathode 21. After that, the cathode lead 25 made of aluminum was attached on one end of the cathode current collector 21A.

20 g of silicon powders and 80 g of copper powders were mixed. The mixture was put in a quartz boat, heated in argon gas atmosphere up to about 1000° C., and cooled down to room temperatures. The mass thereby obtained was pulverized by a ball mill in argon gas atmosphere to obtain copper-silicon (Cu—Si) alloy powders as an anode active material. The obtained copper-silicon alloy powders were observed by a scanning electron microscope. Its average particle diameter was about 10 μm. 80 parts by mass of copper-silicon alloy powders, 10 parts by mass of scale-like graphite as an anode active material and 2 parts by mass of acetylene black as a conductive agent, and 8 parts by mass of polyvinylidene fluoride as a binder were mixed to prepare an anode mixture. Subsequently, this anode mixture was dispersed in N-methyl-2-pyrrolidone of a solvent to obtain an anode mixture slurry. The anode mixture slurry was uniformly applied on the both sides of the anode current collector 22A made of a strip shaped electrolytic copper foil having a thickness of 15 μm, dried, and compression-molded to form the anode active material layer 22B. The resultant was cut in the shape of a strip to form the strip shaped anode 22. After that, the anode lead 26 made of nickel was attached on one end of the anode current collector 22A.

After forming the cathode 21 and the anode 22, the separator 23 made of a micro-porous polyethylene having a thickness of 25 μm was prepared. The anode 22, the separator 23, the cathode 21, and the separator 23 were layered in this order, and this lamination was spirally wound several times. The spirally wound electrode body 20 was thereby fabricated.

After fabricating the spirally wound electrode body 20, the spirally wound electrode body 20 was sandwiched between the pair of insulating plate 12 and 13. The anode lead 26 was welded to the battery can 11, the cathode lead 25 was welded to the safety valve mechanism 15, and the winding body 20 was housed inside the battery can 11 made of nickel-plated iron. After that, the electrolytic solution was injected into the battery can 11 by decompression method. The electrolytic solution wherein the light metallic salt as an electrolyte salt was dissolved in the solvent obtained by mixing 50 vol % of ethylene carbonate and 50 vol % of diethyl carbonate was used.

In this regard, kinds and contents of the light metallic salt were changed as shown in Examples 1-1 to 1-18 in Table 1. In Example 1-1, difluoro[oxalato-O,O']lithium borate expressed by Chemical formula 6 was used. In Examples 1-2 to 1-16, a mixture of difluoro[oxalato-O,O']lithium borate and other light metallic salt was used. In Example 1-17, tetra fluoro[oxalato-O,O']lithium phosphate expressed by Chemical formula 7 was used. In Example 1-18, a mixture of tetra fluoro[oxalato-O,O']lithium phosphate and other light metallic salt was used.

Charge was conducted at a constant current of 700 mA until a battery voltage reached 4.2 V, and then conducted at a constant voltage of 4.2 V until a current reached 2 mA. Discharge was conducted at a constant current of 700 mA until a battery voltage reached 2.5 V. An initial capacity is the discharge capacity at 1st cycle obtained as above. An internal resistance was obtained by conducting AC impedance measurement of 1 kHz in a state of 1st cycle charge. As cycle characteristics, a capacity retention ratio at 100th cycle in relation to the initial capacity (capacity at 100th cycle/initial capacity)×100 was obtained. Obtained results are shown in Table 1.

TABLE 1

| | Anode | | Electrolyte salt | | Initial capacity (mAh) | Internal resistance (mΩ) | Capacity retention ratio (%) |
|---|---|---|---|---|---|---|---|
| | Material | Forming method | Kind | Content (mol/kg) | | | |
| Example 1-1 | Cu—Si | Coating | Chemical formula 6 | 1.0 | 1070 | 99 | 71 |
| Example 1-2 | Cu—Si | Coating | Chemical formula 6 LiPF$_6$ | 0.9 0.1 | 1069 | 98 | 73 |
| Example 1-3 | Cu—Si | Coating | Chemical formula 6 LiPF$_6$ | 0.8 0.2 | 1068 | 97 | 74 |
| Example 1-4 | Cu—Si | Coating | Chemical formula 6 LiPF$_6$ | 0.5 0.5 | 1066 | 95 | 76 |
| Example 1-5 | Cu—Si | Coating | Chemical formula 6 LiPF$_6$ | 0.2 0.8 | 1064 | 93 | 76 |
| Example 1-6 | Cu—Si | Coating | Chemical formula 6 LiPF$_6$ | 0.1 0.9 | 1063 | 93 | 73 |
| Example 1-7 | Cu—Si | Coating | Chemical formula 6 LiPF$_6$ | 0.05 0.95 | 1062 | 95 | 69 |
| Example 1-8 | Cu—Si | Coating | Chemical formula 6 LiPF$_6$ | 0.01 0.99 | 1061 | 98 | 66 |
| Example 1-9 | Cu—Si | Coating | Chemical formula 6 LiPF$_6$ | 1.0 0.5 | 1070 | 96 | 74 |
| Example 1-10 | Cu—Si | Coating | Chemical formula 6 LiPF$_6$ | 1.5 0.5 | 1071 | 98 | 69 |
| Example 1-11 | Cu—Si | Coating | Chemical formula 6 LiPF$_6$ | 2.0 0.5 | 1066 | 100 | 66 |
| Example 1-12 | Cu—Si | Coating | Chemical formula 6 LiBF$_4$ | 0.5 0.5 | 1063 | 98 | 73 |
| Example 1-13 | Cu—Si | Coating | Chemical formula 6 LiClO$_4$ | 0.5 0.5 | 1063 | 98 | 72 |
| Example 1-14 | Cu—Si | Coating | Chemical formula 6 LiAsF$_6$ | 0.5 0.5 | 1065 | 96 | 74 |
| Example 1-15 | Cu—Si | Coating | Chemical formula 6 LiN(CF$_3$SO$_2$)$_2$ | 0.5 0.5 | 1066 | 96 | 76 |
| Example 1-16 | Cu—Si | Coating | Chemical formula 6 LiC(CF$_3$SO$_2$)$_3$ | 0.5 0.5 | 1065 | 96 | 75 |
| Example 1-17 | Cu—Si | Coating | Chemical formula 7 | 1.0 | 1067 | 99 | 70 |
| Example 1-18 | Cu—Si | Coating | Chemical formula 7 LiPF$_6$ | 0.5 0.5 | 1065 | 96 | 75 |
| Comparative example 1-1 | Cu—Si | Coating | LiPF$_6$ | 1.0 | 1060 | 102 | 64 |

After injecting the electrolytic solution into the battery can 11, the battery cover 14 was attached to the battery can 11 through caulking by the gasket 17 whose surface is coated with asphalt. The cylindrical secondary batteries having a diameter of 14 mm and a height of 65 mm were thereby obtained for Examples 1-1 to 1-18.

As Comparative example 1-1 in relation to Examples 1-1 to 1-18, a secondary battery was fabricated in a manner similar to in Examples 1-1 to 1-18 except that only LiPF$_6$ was used as an electrolyte salt, and its content was 1.0 mol/kg in relation to the solvent.

Regarding the fabricated secondary batteries of Examples 1-1 to 1-18 and Comparative example 1-1, charge and discharge tests were conducted, and each initial capacity, internal resistance, and cycle characteristics were examined.

As shown in Table 1, according to Examples 1-1 to 1-18 using the light metallic salt having M-X bond, the initial capacity and the capacity retention ratio could be improved, and further the internal resistance could be reduced, compared to Comparative example 1-1, not using the light metallic salt having M-X bond. That is, it was found that the capacity and the cycle characteristics could be improved and the internal resistance could be reduced if the light metallic salt having M-X bond was contained in the electrolytic solution when the compound of the metalloid element capable of forming an alloy with lithium was contained in the anode active material layer 22B.

As evidenced by Examples 1-1 to 1-8, 1-12 to 1-16, and 1-17 to 1-18, according to Examples 1-2 to 1-8, 1-12 to 1-16, and 1-18, using the mixture of the light metallic salt having M-X bond and other metallic salt, the internal resistance could be reduced compared to Examples 1-1 and 1-17, using only the light metallic salt having M-X bond. That effect was particularly high when using $LiPF_6$. Further, when the mixture of the light metallic salt having M-X bond and other light metallic salt was used, higher capacity retention ratios could be obtained by adjusting their contents. In this regard, it was found that when the light metallic salt having M-X bond and other light metallic salt were contained in the electrolytic solution, higher effects could be obtained.

In addition, it was confirmed that when the content of the light metallic salt having M-X bond was from about 0.01 mol/kg to about 2.0 mol/kg, the capacity and the cycle characteristics could be improved, and the internal resistance could be reduced.

EXAMPLE 2-1 AND 2-2

Secondary batteries were fabricated in a manner similar to in Examples 1-1 to 1-18, except that tin was used as the anode active material, the anode active material layer 22B made of tin having a thickness of 2 μm was formed on the anode current collector 22A made of an electrolytic copper foil having a thickness of 25 μm by electron beam deposition method, and the resultant was provided with heat treatment for 12 hours at 200° C. to form the anode 22. In this regard, types and contents of the light metallic salt were changed as shown in Table 2. When the obtained anode 22 was analyzed by XPS (X-ray Photoelectron Spectroscopy), AES (Auger Electron Spectroscopy), and X-ray diffraction method, it was confirmed that the anode active material layer 22B was alloyed with the anode current collector 22A at least on part of the interface with the anode current collector 22A.

salt having M-X bond, as in Examples 1-1 and 1-4. Specifically, in Example 2-2, using the mixture of the light metallic salt having M-X bond and other light metallic salt, the effect was large.

When tin, a simple substance of the metal element capable of forming an alloy with lithium was used as an anode active material, and when the anode active material layer 22B was formed by vapor-phase deposition method, the capacity and the cycle characteristics could be improved, and the internal resistance could be reduced if the light metallic salt having M-X bond was included in the electrolytic solution. It was also found that when the light metallic salt having M-X bond and other light metallic salt were included in the electrolytic solution, higher effect could be obtained.

EXAMPLES 3-1 TO 3-39

Figure 3:
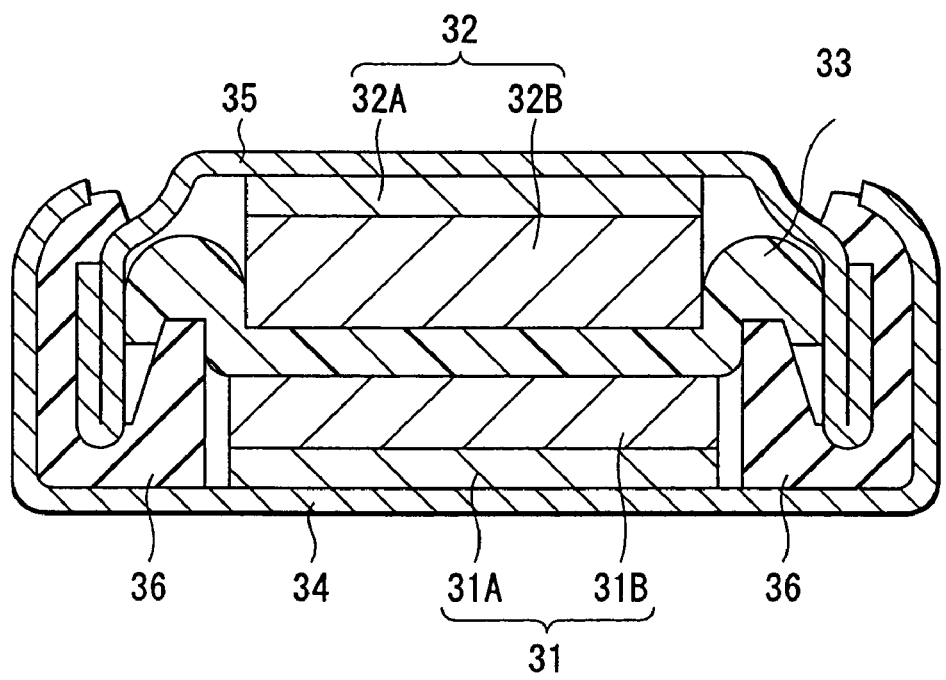
FIG. 3 is a cross sectional view which shows a construction of a secondary battery formed in Examples pursuant to an embodiment of the present invention.

Silicon of an anode active material was deposited to form the anode active material layer, and coin type secondary batteries shown in FIG. 3 were fabricated. In this secondary battery, a discoid cathode 31 and a discoid anode 32 are layered with a separator 33 in between, and the lamination is housed between an exterior can 34 and an exterior cup 35.

First, lithium cobalt complex oxide of a cathode active material having an average particle diameter of 5 μm, carbon black of a conductive agent, and polyvinylidene fluoride of a binder were mixed at a mass ratio of 92:3:5 to prepare a cathode mixture. Next, this cathode mixture was dispersed in N-methyl-2-pyrolidone of a solvent to obtain a cathode mixture slurry. This cathode mixture slurry was applied on a cathode current collector 31A made of a strip shaped aluminum foil having a thickness of 20 μm, dried, and compres-

TABLE 2

| | Anode | | Electrolyte salt | | Initial | Internal | Capacity retention |
|---|---|---|---|---|---|---|---|
| | Material | Forming method | Kind | Content (mol/kg) | capacity (mAh) | resistance (mΩ) | ratio (%) |
| Example 1-1 | Cu—Si | Coating | Chemical formula 6 | 1.0 | 1070 | 99 | 71 |
| Example 1-4 | Cu—Si | Coating | Chemical formula 6 $LiPF_6$ | 0.5 0.5 | 1066 | 95 | 76 |
| Example 2-1 | Sn | Deposition | Chemical formula 6 | 1.0 | 1134 | 97 | 68 |
| Example 2-2 | Sn | Deposition | Chemical formula 6 $LiPF_6$ | 0.5 0.5 | 1130 | 93 | 72 |
| Comparative example 1-1 | Cu—Si | Coating | $LiPF_6$ | 1.0 | 1060 | 102 | 64 |
| Comparative example 2-1 | Sn | Deposition | $LiPF_6$ | 1.0 | 1120 | 100 | 60 |

As Comparative example 2-1 in relation to Examples 2-1 and 2-2, a secondary battery was fabricated in a manner similar to in Examples 2-1 and 2-2, except that only $LiPF_6$ was used as an electrolyte salt, and its content was 0.1 mol/kg in relation to the solvent.

Regarding the fabricated secondary batteries of Examples 2-1, 2-2, and Comparative example 2-1, charge and discharge was conducted to examine the initial capacity, the internal resistance, and the cycle characteristics as in Examples 1-1 to 1-18. The results are shown in Table 2 along with the results of Examples 1-1, 1-4 and Comparative example 1-1.

As evidenced by Table 2, according to Examples 2-1 and 2-2, using the light metallic salt having M-X bond, the initial capacity and the capacity retention ratio could be increased, and further the internal resistance could be reduced compared to the Comparative example 2-1 not using the light metallic sion-molded to form a cathode active material layer 31B. The cathode 31 was thereby fabricated.

An electrolytic copper foil having an arithmetic average roughness Ra of 0.5 μm and a thickness of 35 μm was prepared as an anode current collector 32A. An anode active material layer 32B made of silicon having a thickness of 4 μm was formed on this anode current collector 32A by deposition method. The resultant was heated to form the anode 32. The obtained anode 32 was analyzed by XPS and AES. In result, it was confirmed that the anode active material layer 32B was alloyed with the anode current collector 32A at least on part of the interface with the anode current collector 32A.

Next, the anode 32 and the separator 33 made of polypropylene having a thickness of 25 μm were sequentially layered in the center of the exterior cup 35, the electrolytic solution was injected, the resultant was covered by the exterior can 34 in which the cathode 31 was inserted, and the whole body was provided with caulking through a gasket 36. In result, the coin type secondary battery having a diameter of 20 mm and a height of 1.6 mm was thereby fabricated. As an electrolytic solution, solution wherein a light metallic salt as an electrolyte salt was dissolved in a solvent in which ethylene carbonate and diethyl carbonate were mixed at a volume ratio of 1:1 was used. In this regard, types and contents of the light metallic salt were changed as shown in Examples 3-1 to 3-39 in Tables 3 to 6.

TABLE 3

| | Anode | | Electrolyte salt | | Initial capacity (mAh) | Capacity retention ratio (%) |
|---|---|---|---|---|---|---|
| | Material | Forming method | Kind | Content (mol/kg) | | |
| Example 3-1 | Si | Deposition | Chemical formula 6 | 1.0 | 6.25 | 82.4 |
| Example 3-2 | Si | Deposition | Chemical formula 6<br>$LiPF_6$ | 0.9<br>0.1 | 6.27 | 85.3 |
| Example 3-3 | Si | Deposition | Chemical formula 6<br>$LiPF_6$ | 0.8<br>0.2 | 6.28 | 87.2 |
| Example 3-4 | Si | Deposition | Chemical formula 6<br>$LiPF_6$ | 0.5<br>0.5 | 6.27 | 87.0 |
| Example 3-5 | Si | Deposition | Chemical formula 6<br>$LiPF_6$ | 0.2<br>0.8 | 6.27 | 85.8 |
| Example 3-6 | Si | Deposition | Chemical formula 6<br>$LiPF_6$ | 0.1<br>0.9 | 6.26 | 84.3 |
| Example 3-7 | Si | Deposition | Chemical formula 6<br>$LiPF_6$ | 0.05<br>0.95 | 6.25 | 82.5 |
| Example 3-8 | Si | Deposition | Chemical formula 6<br>$LiPF_6$ | 0.01<br>0.99 | 6.25 | 81.2 |
| Example 3-9 | Si | Deposition | Chemical formula 6<br>$LiPF_6$ | 1.0<br>0.2 | 6.25 | 84.1 |
| Example 3-10 | Si | Deposition | Chemical formula 6<br>$LiPF_6$ | 1.5<br>0.2 | 6.25 | 83.2 |
| Example 3-11 | Si | Deposition | Chemical formula 6<br>$LiPF_6$ | 2.0<br>0.2 | 6.25 | 81.1 |
| Comparative example 3-1 | Si | Deposition | $LiPF_6$ | 1.0 | 6.25 | 81.0 |
| Comparative example 3-2 | Si | Deposition | $LiBF_4$ | 1.0 | 6.24 | 80.3 |
| Comparative example 3-3 | Si | Deposition | $LiClO_4$ | 1.0 | 6.24 | 75.4 |
| Comparative example 3-4 | Si | Deposition | $LiAsF_6$ | 1.0 | 5.82 | 72.8 |
| Comparative example 3-5 | Si | Deposition | $LiN(CF_3SO_2)_2$ | 1.0 | Unable to charge | — |
| Comparative example 3-6 | Si | Deposition | $LiC(CF_3SO_2)_3$ | 1.0 | 6.08 | 82.4 |

TABLE 4

| | Anode | | Electrolyte salt | | Initial capacity (mAh) | Capacity retention ratio (%) |
|---|---|---|---|---|---|---|
| | Material | Forming method | Kind | Content (mol/kg) | | |
| Example 3-12 | Si | Deposition | Chemical formula 6<br>$LiBF_4$ | 0.8<br>0.2 | 6.25 | 82.4 |
| Example 3-13 | Si | Deposition | Chemical formula 6<br>$LiPF_6$<br>$LiBF_4$ | 0.8<br>0.1<br>0.1 | 6.27 | 83.1 |
| Example 3-14 | Si | Deposition | Chemical formula 6<br>$LiClO_4$ | 0.8<br>0.2 | 6.26 | 78.0 |
| Example 3-15 | Si | Deposition | Chemical formula 6<br>$LiPF_6$<br>$LiClO_4$ | 0.8<br>0.1<br>0.1 | 6.28 | 80.6 |
| Example 3-16 | Si | Deposition | Chemical formula 6<br>$LiAsF_6$ | 0.8<br>0.2 | 6.03 | 75.3 |
| Example 3-17 | Si | Deposition | Chemical formula 6<br>$LiPF_6$<br>$LiAsF_6$ | 0.8<br>0.1<br>0.1 | 6.16 | 78.4 |
| Example 3-18 | Si | Deposition | Chemical formula 6<br>$LiN(CF_3SO_2)_2$ | 0.8<br>0.2 | 6.24 | 84.2 |
| Example 3-19 | Si | Deposition | Chemical formula 6<br>$LiPF_6$<br>$LiN(CF_3SO_2)_2$ | 0.8<br>0.1<br>0.1 | 6.27 | 87.0 |

TABLE 4-continued

|  | Anode | | Electrolyte salt | | Initial capacity (mAh) | Capacity retention ratio (%) |
|---|---|---|---|---|---|---|
|  | Material | Forming method | Kind | Content (mol/kg) | | |
| Example 3-20 | Si | Deposition | Chemical formula 6<br>$LiC(CF_3SO_2)_3$ | 0.8<br>0.2 | 6.12 | 83.6 |
| Example 3-21 | Si | Deposition | Chemical formula 6<br>$LiPF_6$<br>$LiC(CF_3SO_2)_3$ | 0.8<br>0.1<br>0.1 | 6.20 | 84.0 |
| Comparative example 3-1 | Si | Deposition | $LiPF_6$ | 1.0 | 6.25 | 81.0 |
| Comparative example 3-2 | Si | Deposition | $LiBF_4$ | 1.0 | 6.24 | 80.3 |
| Comparative example 3-3 | Si | Deposition | $LiClO_4$ | 1.0 | 6.24 | 75.4 |
| Comparative example 3-4 | Si | Deposition | $LiAsF_6$ | 1.0 | 5.82 | 72.8 |
| Comparative example 3-5 | Si | Deposition | $LiN(CF_3SO_2)_2$ | 1.0 | Unable to charge | — |
| Comparative example 3-6 | Si | Deposition | $LiC(CF_3SO_2)_3$ | 1.0 | 6.08 | 82.4 |

TABLE 5

|  | Anode | | Electrolyte salt | | Initial capacity (mAh) | Capacity retention ratio (%) |
|---|---|---|---|---|---|---|
|  | Material | Forming method | Kind | Content (mol/kg) | | |
| Example 3-22 | Si | Deposition | Chemical formula 8 | 1.0 | 6.25 | 81.6 |
| Example 3-23 | Si | Deposition | Chemical formula 8<br>$LiPF_6$ | 0.9<br>0.1 | 6.26 | 82.7 |
| Example 3-24 | Si | Deposition | Chemical formula 8<br>$LiPF_6$ | 0.8<br>0.2 | 6.26 | 83.6 |
| Example 3-25 | Si | Deposition | Chemical formula 8<br>$LiPF_6$ | 0.5<br>0.5 | 6.27 | 86.8 |
| Example 3-26 | Si | Deposition | Chemical formula 8<br>$LiPF_6$ | 0.2<br>0.8 | 6.28 | 87.4 |
| Example 3-27 | Si | Deposition | Chemical formula 8<br>$LiPF_6$ | 0.1<br>0.9 | 6.27 | 86.3 |
| Example 3-28 | Si | Deposition | Chemical formula 8<br>$LiPF_6$ | 0.05<br>0.95 | 6.25 | 84.5 |
| Example 3-29 | Si | Deposition | Chemical formula 8<br>$LiPF_6$ | 0.01<br>0.99 | 6.25 | 81.6 |
| Comparative example 3-1 | Si | Deposition | $LiPF_6$ | 1.0 | 6.25 | 81.0 |

TABLE 6

|  | Anode | | Electrolyte salt | | Initial capacity (mAh) | Capacity retention ratio (%) |
|---|---|---|---|---|---|---|
|  | Material | Forming method | Kind | Content (mol/kg) | | |
| Example 3-30 | Si | Deposition | Chemical formula 7 | 1.0 | 6.26 | 82.8 |
| Example 3-31 | Si | Deposition | Chemical formula 7<br>$LiPF_6$ | 0.8<br>0.2 | 6.27 | 84.5 |
| Example 3-32 | Si | Deposition | Chemical formula 9 | 1.0 | 6.28 | 86.4 |
| Example 3-33 | Si | Deposition | Chemical formula 9<br>$LiPF_6$ | 0.8<br>0.2 | 6.28 | 87.0 |
| Example 3-34 | Si | Deposition | Chemical formula 10 | 1.0 | 6.26 | 83.1 |
| Example 3-35 | Si | Deposition | Chemical formula 10<br>$LiPF_6$ | 0.8<br>0.2 | 6.26 | 85.1 |
| Example 3-36 | Si | Deposition | Chemical formula 11 | 1.0 | 6.25 | 81.2 |
| Example 3-37 | Si | Deposition | Chemical formula 11<br>$LiPF_6$ | 0.8<br>0.2 | 6.25 | 81.6 |
| Example 3-38 | Si | Deposition | Chemical formula 12 | 1.0 | 6.25 | 81.3 |
| Example 3-39 | Si | Deposition | Chemical formula 12<br>$LiPF_6$ | 0.8<br>0.2 | 6.25 | 81.5 |
| Comparative example 3-1 | Si | Deposition | $LiPF_6$ | 1.0 | 6.25 | 81.0 |

TABLE 6-continued

| | Anode | | Electrolyte salt | | Initial capacity (mAh) | Capacity retention ratio (%) |
|---|---|---|---|---|---|---|
| | Material | Forming method | Kind | Content (mol/kg) | | |
| Comparative example 3-2 | Si | Deposition | $LiBF_4$ | 1.0 | 6.24 | 80.3 |
| Comparative example 3-3 | Si | Deposition | $LiClO_4$ | 1.0 | 6.24 | 75.4 |
| Comparative example 3-4 | Si | Deposition | $LiAsF_6$ | 1.0 | 5.82 | 72.8 |
| Comparative example 3-5 | Si | Deposition | $LiN(CF_3SO_2)_2$ | 1.0 | Unable to charge | — |
| Comparative example 3-6 | Si | Deposition | $LiC(CF_3SO_2)_3$ | 1.0 | 6.08 | 82.4 |

In Example 3-1, difluoro[oxalato-O,O']lithium borate expressed by Chemical formula 6 was used. In Examples 3-2 to 3-21, the mixture of difluoro[oxalato-O,O']lithium borate and other light metallic salt was used. In Example 3-22, bis[oxalato-O,O']lithium borate expressed by Chemical formula 8 was used. In Examples 3-23 to 3-29, the mixture of bis[oxalato-O,O']lithium borate and other light metallic salt was used. In Example 3-30, tetra fluoro[oxalato-O,O']lithium phosphate expressed by Chemical formula 7 was used. In Example 3-31, the mixture of tetra fluoro[oxalato-O,O'] lithium phosphate and other light metallic salt was used. In Example 3-32, difluorodi[oxalato-O,O']lithium phosphate expressed by Chemical formula 9 was used. In Example 3-33, the mixture of difluorodi[oxalato-O,O']lithium phosphate and the other light metallic salt was used. In Example 3-34, tris[oxalato-O,O']lithium phosphate expressed by Chemical formula 10 was used. In Example 3-35, the mixture of tris [oxalato-O,O']lithium phosphate and other light metallic salt was used. In Example 3-36, bis[1,2-benzene diorate (2-)-O, O']lithium borate expressed by Chemical formula 11 was used. In Example 3-37, the mixture of bis[1,2-benzene diorate (2-)-O,O']lithium borate and other light metallic salt was used. In Example 3-38, tris[1,2-benzene diorate (2-)-O,O'] lithium phosphate expressed by Chemical formula 12 was used. In Example 3-39, the mixture of tris[1,2-benzene diorate (2-)-O,O']lithium phosphate and other light metallic salt was used.

As Comparative examples 3-1 to 3-6 in relation to Examples 3-1 to 3-39, secondary batteries were fabricated in a manner similar to in Examples 3-1 to 3-39, except that only one of $LiPF_6$, $LiBF_4$, $LiClO_4$, $LiAsF_6$, $LiN(CF_3SO_2)_2$, and $LiC(CF_3SO_2)_3$ was used as an electrolyte salt, and the content was 1.0 mol/kg in relation to the solvent.

Regarding the fabricated secondary batteries of Examples 3-1 to 3-39 and Comparative examples 3-1 to 3-6, charge and discharge tests were conducted, and each capacity and cycle characteristics were examined. Charge was conducted at a constant current density of 1 mA/cm$^2$ until a battery voltage reached 4.2 V, and then conducted at a constant voltage of 4.2 V until a current density reached 0.02 mA/cm$^2$. Discharge was conducted at a constant current density of 1 mA/cm$^2$ until a battery voltage reached 2.5 V. In charge and discharge, an anode utility factor at the initial charge was set to 90% based on the charge and discharge capacity of the cathode 31 and the anode 32 previously obtained by calculation to prevent metal lithium from depositing on the anode 32. As cycle characteristics, a capacity retention ratio at 10th cycle in relation to the initial capacity (capacity at 10th cycle/initial capacity)×100 was obtained. Obtained results are shown in Tables 3 to 6.

As shown in Tables 3 to 6, according to Examples 3-1 to 3-39, using the light metallic salt having M-X bond, the capacity retention ratio could be improved compared to Comparative examples 3-1 to 3-6, not using the light metallic salt having M-X bond, and in some cases the initial capacity could be also improved. When the mixture of the light metallic salt having M-X bond and $LiPF_6$ was used, the initial capacity and the capacity retention ratio could be improved depending on contents. Further, it could be confirmed that when the content of the light metallic salt having M-X bond was from 0.01 mol/kg to 2.0 mol/kg, the capacity and the cycle characteristics could be improved.

In this regard, it was found that the capacity and the cycle characteristics could be improved if the light metallic salt having M-X bond was included in the electrolytic solution both when silicon of a simple substance of the metalloid elements capable of forming an alloy with lithium was used and when the anode active material layer 32B was formed by vapor-phase deposition method. Further, it was found that when the mixture of the light metallic salt having M-X bond and $LiPF_6$ was contained in the electrolytic solution, a higher effect could be obtained by adjusting their contents. Furthermore, it was found that the content of the light metallic salt having M-X bond was preferably from 0.01 mol/kg to 2.0 mol/kg.

EXAMPLES 4-1 TO 4-17

Coin type secondary batteries shown in FIG. 3 were fabricated in a manner similar to in Examples 3-1 to 3-39, except that the anode 32 was fabricated by using tin as an anode active material, forming the anode active material layer 32B made of tin having a thickness of 4 μm on the anode current collector 32A made of an electrolytic copper foil having an arithmetic average roughness Ra of 0.5 μm and a thickness of 25 μm by electrolytic plating, and providing the resultant with heat treatment. In this regard, kinds and contents of the light metallic salt were changed as shown in Tables 7 and 8.

TABLE 7

| | Anode | | Electrolyte salt | | Initial capacity (mAh) | Capacity retention ratio (%) |
|---|---|---|---|---|---|---|
| | Material | Forming method | Kind | Content (mol/kg) | | |
| Example 4-1 | Sn | Plating | Chemical formula 6 | 1.0 | 3.15 | 77.0 |
| Example 4-2 | Sn | Plating | Chemical formula 6 | 0.8 | 3.17 | 80.0 |
| | | | $LiPF_6$ | 0.2 | | |
| Example 4-3 | Sn | Plating | Chemical formula 6 | 0.8 | 3.15 | 70.1 |
| | | | $LiBF_4$ | 0.2 | | |
| Example 4-4 | Sn | Plating | Chemical formula 6 | 0.8 | 3.13 | 67.4 |
| | | | $LiClO_4$ | 0.2 | | |
| Example 4-5 | Sn | Plating | Chemical formula 6 | 0.8 | 3.06 | 63.0 |
| | | | $LiAsF_6$ | 0.2 | | |
| Example 4-6 | Sn | Plating | Chemical formula 6 | 0.8 | 3.15 | 76.2 |
| | | | $LiN(CF_3SO_2)_2$ | 0.2 | | |
| Example 4-7 | Sn | Plating | Chemical formula 6 | 0.8 | 3.13 | 75.0 |
| | | | $LiC(CF_3SO_2)_3$ | 0.2 | | |
| Comparative example 4-1 | Sn | Plating | $LiPF_6$ | 1.0 | 3.15 | 74.2 |
| Comparative example 4-2 | Sn | Plating | $LiBF_4$ | 1.0 | 3.15 | 68.5 |
| Comparative example 4-3 | Sn | Plating | $LiClO_4$ | 1.0 | 3.13 | 63.2 |
| Comparative example 4-4 | Sn | Plating | $LiAsF_6$ | 1.0 | 2.87 | 61.7 |
| Comparative example 4-5 | Sn | Plating | $LiN(CF_3SO_2)_2$ | 1.0 | Unable to charge | — |
| Comparative example 4-6 | Sn | Plating | $LiC(CF_3SO_2)_3$ | 1.0 | 3.00 | 73.8 |

TABLE 8

| | Anode | | Electrolyte salt | | Initial capacity (mAh) | Capacity retention ratio (%) |
|---|---|---|---|---|---|---|
| | Material | Forming method | Kind | Content (mol/kg) | | |
| Example 4-8 | Sn | Plating | Chemical formula 7 | 1.0 | 3.15 | 77.0 |
| Example 4-9 | Sn | Plating | Chemical formula 7 | 0.8 | 3.15 | 77.2 |
| | | | $LiPF_6$ | 0.2 | | |
| Example 4-10 | Sn | Plating | Chemical formula 9 | 1.0 | 3.17 | 77.0 |
| Example 4-11 | Sn | Plating | Chemical formula 9 | 0.8 | 3.17 | 78.1 |
| | | | $LiPF_6$ | 0.2 | | |
| Example 4-12 | Sn | Plating | Chemical formula 10 | 1.0 | 3.15 | 76.1 |
| Example 4-13 | Sn | Plating | Chemical formula 10 | 0.8 | 3.15 | 77.0 |
| | | | $LiPF_6$ | 0.2 | | |
| Example 4-14 | Sn | Plating | Chemical formula 11 | 1.0 | 3.15 | 74.3 |
| Example 4-15 | Sn | Plating | Chemical formula 11 | 0.8 | 3.15 | 74.7 |
| | | | $LiPF_6$ | 0.2 | | |
| Example 4-16 | Sn | Plating | Chemical formula 12 | 1.0 | 3.15 | 74.3 |
| Example 4-17 | Sn | Plating | Chemical formula 12 | 0.8 | 3.15 | 74.8 |
| | | | $LiPF_6$ | 0.2 | | |
| Comparative example 4-1 | Sn | Plating | $LiPF_6$ | 1.0 | 3.15 | 74.2 |
| Comparative example 4-2 | Sn | Plating | $LiBF_4$ | 1.0 | 3.15 | 68.5 |
| Comparative example 4-3 | Sn | Plating | $LiClO_4$ | 1.0 | 3.13 | 63.2 |
| Comparative example 4-4 | Sn | Plating | $LiAsF_6$ | 1.0 | 2.87 | 61.7 |
| Comparative example 4-5 | Sn | Plating | $LiN(CF_3SO_2)_2$ | 1.0 | Unable to charge | — |
| Comparative example 4-6 | Sn | Plating | $LiC(CF_3SO_2)_3$ | 1.0 | 3.00 | 73.8 |

In Example 4-1, difluoro[oxalato-O,O']lithium borate expressed by Chemical formula 6 was used. In Examples 4-2 to 4-7, the mixture of difluoro[oxalato-O,O']lithium borate and other light metallic salt was used. In Example 4-8, tetra fluoro[oxalato-O,O']lithium phosphate expressed by Chemical formula 7 was used. In Example 4-9, the mixture of tetra fluoro[oxalato-O,O']lithium phosphate and other light metallic salt was used. In Example 4-10, difluorodi[oxalato-O,O']lithium phosphate expressed by Chemical formula 9 was used. In Example 4-11, the mixture of difluorodi[oxalato-O,O']lithium phosphate and the other light metallic salt was used. In Example 4-12, tris[oxalato-O,O']lithium phosphate expressed by Chemical formula 10 was used. In Example 4-13, the mixture of tris[oxalato-O,O']lithium phosphate and other light metallic salt was used. In Example 4-14, bis[1,2-benzene diorate (2-)-O,O']lithium borate expressed by Chemical formula 11 was used. In Example 4-15, the mixture of bis[1,2-benzene diorate (2-)-O,O']lithium borate and other light metallic salt was used. In Example 4-16, tris[1,2-benzene diorate (2-)-O,O']lithium phosphate expressed by Chemical formula 12 was used. In Example 4-17, the mixture of tris[1,2-benzene diorate (2-)-O,O']lithium phosphate and other light metallic salt was used.

Regarding Examples 4-1 to 4-17, the obtained anode 32 was also analyzed by XPS and AES. In result, it was confirmed that the anode active material layer 32B was alloyed with the anode current collector 32A at least on part of the interface with the anode current collector 32A.

As Comparative examples 4-1 to 4-6 in relation to Examples 4-1 to 4-17, secondary batteries were fabricated in a manner similar to in Examples 4-1 to 4-17, except that only one of $LiPF_6$, $LiBF_4$, $LiClO_4$, $LiAsF_6$, $LiN(CF_3SO_2)_2$, and $LiC(CF_3SO_2)_3$ was used as the electrolyte salt, and the content was 1.0 mol/kg in relation to the solvent.

Regarding the fabricated secondary batteries of Examples 4-1 to 4-17 and Comparative examples 4-1 to 4-6, charge and discharge tests were conducted as in Examples 3-1 to 3-39, and each initial capacity and each capacity retention ratio at 10th cycle were examined. Obtained results are shown in Tables 7 and 8.

As shown in Tables 7 and 8, according to Examples 4-1 to 4-17, using the light metallic salt having M-X bond, the capacity retention ratio could be improved compared to Comparative examples 4-1 to 4-6 not using the light metallic salt having M-X bond, and in some cases the initial capacity could be also improved. When the mixture of the light metallic salt having M-X bond and $LiPF_6$ was used, higher effect could be obtained.

In this regard, it was found that the capacity and the cycle characteristics could be improved if the light metallic salt having M-X bond was included in the electrolytic solution when the anode active material layer 32B was formed by liquid-phase deposition method. It was also found that when the mixture of the light metallic salt having M-X bond and $LiPF_6$ was included in the electrolytic solution, higher effect could be obtained.

EXAMPLES 5-1 TO 5-8

Coin type secondary batteries shown in FIG. 3 were fabricated in a manner similar to in Examples 3-1 to 3-39, except that tin was used as an anode active material, and the anode active material layer 32B made of tin was formed on the anode current collector 32A made of an electrolytic copper foil having an arithmetic average roughness Ra of 0.5 μm and a thickness of 25 μm by sintering method. Specifically, tin powders and polyvinylidene fluoride of a binder were mixed at a mass ratio of 95:5, the mixture was dispersed in N-methyl-2-pyrrolidone of a solvent. The resultant was applied to the anode current collector 32A, dried, pressurized, and fired at 200° C. to form the anode active material layer 32B. The anode 32 was thereby formed. Kinds and contents of the light metallic salt were changed as shown in Table 9.

TABLE 9

|  | Anode | | Electrolyte salt | | Initial capacity (mAh) | Capacity retention ratio (%) |
| --- | --- | --- | --- | --- | --- | --- |
|  | Material | Forming method | Kind | Content (mol/kg) | | |
| Example 5-1 | Sn | Sintering | Chemical formula 8 | 1.0 | 3.15 | 75.0 |
| Example 5-2 | Sn | Sintering | Chemical formula 8 $LiPF_6$ | 0.9 0.1 | 3.15 | 75.2 |
| Example 5-3 | Sn | Sintering | Chemical formula 8 $LiPF_6$ | 0.8 0.2 | 3.16 | 76.1 |
| Example 5-4 | Sn | Sintering | Chemical formula 8 $LiPF_6$ | 0.5 0.5 | 3.17 | 77.4 |
| Example 5-5 | Sn | Sintering | Chemical formula 8 $LiPF_6$ | 0.2 0.8 | 3.17 | 78.7 |
| Example 5-6 | Sn | Sintering | Chemical formula 8 $LiPF_6$ | 0.1 0.9 | 3.16 | 78.2 |
| Example 5-7 | Sn | Sintering | Chemical formula 8 $LiPF_6$ | 0.05 0.95 | 3.15 | 77.8 |
| Example 5-8 | Sn | Sintering | Chemical formula 8 $LiPF_6$ | 0.01 0.99 | 3.15 | 77.0 |
| Comparative example 5-1 | Sn | Sintering | $LiPF_6$ | 1.0 | 3.15 | 74.2 |

In Example 5-1, bis[oxalato-O,O']lithium borate expressed by Chemical formula 8 was used. In Examples 5-2 to 5-8, the mixture of bis[oxalato-O,O']lithium borate and other light metallic salt was used.

Regarding Examples 5-1 to 5-8, the obtained anode 32 was also analyzed by XPS and AES. In result, it was confirmed that the anode active material layer 32B was alloyed with the anode current collector 32A at least on part of the interface with the anode current collector 32A.

As Comparative example 5-1 in relation to Examples 5-1 to 5-8, a secondary battery was fabricated in a manner similar to in Examples 5-1 to 5-8, except that $LiPF_6$ was used as an electrolyte salt, and the content was 1.0 mol/kg in relation to the solvent.

Regarding the fabricated secondary batteries of Examples 5-1 to 5-8 and Comparative example 5-1, charge and discharge tests were conducted as in Examples 3-1 to 3-39, and each initial capacity and each capacity retention ratio at 10th cycle were examined. Obtained results are shown in Table 9.

As shown in Table 9, according to Examples 5-1 to 5-8, using the light metallic salt having M-X bond, the capacity retention ratio could be improved compared to Comparative example 5-1 not using the light metallic salt having M-X bond, and in some cases the initial capacity could be also improved. When the mixture of the light metallic salt having M-X bond and $LiPF_6$ was used, higher effect could be obtained.

In this regard, it was found that the capacity and the cycle characteristics could be improved if the light metallic salt having M-X bond was included in the electrolytic solution when the anode active material layer 32B was formed by sintering method. It was also found that the mixture of the light metallic salt having M-X bond and $LiPF_6$ was contained in the electrolytic solution, higher effect could be obtained.

In the foregoing Examples, descriptions have been given of the light metallic salt having M-X bond taking concrete examples. It is thought that the above-mentioned effect resulted from the structure thereof. Therefore, similar results can be obtained when other light metallic salt having M-X bond is used. Further, in the foregoing Examples, descriptions have been given of the case using the electrolytic solution. However, similar results can be obtained when a gelatinous electrolyte is used.

While the invention has been described with reference to the embodiment and Examples, the invention is not limited to the foregoing embodiment and Examples, and various modifications may be made. For example, in the foregoing embodiment and Examples, descriptions have been given of the secondary battery using the electrolytic solution or the gelatinous electrolyte, one of the solid electrolytes. However, the invention can be applied to a secondary battery using other electrolyte. Examples of other electrolytes include a high molecular weight solid electrolyte wherein an electrolyte salt is dispersed in a high molecular weight compound having ion conductivity; an ion conductive inorganic compound consisted of ion conductive ceramics, ion conductive glasses or ionic crystals; a mixture of the ion conductive inorganic compound and an electrolytic solution; and a mixture of the ion conductive inorganic compound and the gelatinous electrolyte/the high molecular weight solid electrolyte.

Further, in the foregoing embodiment and Examples, descriptions have been given of the cylindrical type secondary battery having a winding structure or the coin type secondary battery. However, the invention can be applied to batteries having other structures, for example, a secondary battery in the shape of an oval or a polygon having a winding structure, or a secondary battery having a structure wherein the cathode and the anode are folded or layered. Further, the invention can be applied to a button type, a square type, or a card type secondary battery. Further, the invention can be applied to primary batteries instead of the secondary batteries.

In the foregoing embodiment and Examples, descriptions have been given of the case using lithium as an electrode reactant. However, this invention can be applied to the case using other alkali metal such as sodium (Na) and potassium (K); an alkali earth metal such as magnesium and calcium (Ca); and other light metal such as aluminum, and the similar effect can be also obtained. In this case, as an anode active material, at least one, such as simple substances, alloys, and compounds of metal elements capable of forming an alloy with the light metal; and simple substances, alloys, and compounds of metalloid elements capable of forming an alloy with the light metal is used. The anode capacity includes the capacity component derived from inserting and extracting the light metal by the anode active material. A cathode material capable of inserting and extracting the light metal, an electrolyte or the like are selected according to the applied light metal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A battery comprising:
   a cathode;
   an anode having an anode active material including silicon deposited on a current collector material by vapor-phase deposition, wherein the silicon is alloyed with at least part of the current collector, and
   an electrolyte,
   wherein the electrolyte includes
   a light metallic salt having M-X bond where M represents a transition metal element or a 3B Group element, a 4B Group element, or a 5B Group element in a short-period periodic table and where X represents oxygen (O) or sulfur (S),
   at least one or more additional light metallic salts selected from the group consisting of $LiPF_6$, $LiBF_4$, $LiClO_4$, $LiAsF_6$, a lithium salt expressed by Chemical formula 11, and a lithium salt expressed by Chemical formula 12, where Chemical formulas 11 and 12 are provided as follows:

$$LiN(C_mF_{2m+1}SO_2)(C_nF_{2n+1}SO_2) \quad \text{Chemical formula 11}$$

where m and n are integer numbers ranging from 1 or greater $$LiC(C_pF_{2p+1}SO_2)(C_qF_{2q+1}SO_2)(C_rF_{2r+1}SO_2) \quad \text{Chemical formula 12}$$

where p, q, and r are integer numbers ranging from 1 or greater, and
   wherein the anode active material excludes a binder.

2. The battery according to claim 1, wherein the light metallic salt has B—O bond or P—O bond.

3. The battery according to claim 1, wherein the light metallic salt has O—B—O bond or O—P—O bond.

4. The battery according to claim 1, wherein the light metallic salt is a cyclic compound.

5. The battery according to claim 1, wherein the electrolyte further includes a solvent, and the content of the light metallic salt ranges from about 0.01 mol/kg to about 2.0 mol/kg in relation to the solvent.

6. The battery according to claim 1, wherein the electrolyte further includes one or more additional light metallic salts in addition to the light metallic salt.

7. The battery according to claim 1, wherein the electrolyte further includes a high molecular weight compound or an ion conductive inorganic compound.

8. The battery according to claim 1, wherein the cathode includes a lithium-containing compound containing lithium (Li), at least one selected from the group consisting of cobalt (Co), nickel (Ni), and manganese (Mn), and oxygen (O).

9. The battery according to claim 1, wherein a surface roughness of the anode current collector is about 0.1 μm or more by arithmetic average roughness.

10. The battery according to claim 1, wherein the light metallic salt and the additional light metallic salts are in a ratio of from 9:1 to 1:9.

11. The battery according to claim 1, wherein the anode active material including silicon has a thickness of approximately 4 μm or less.

12. A battery comprising:
   a cathode;
   an anode having an anode active material including silicon deposited on a current collector material by vapor-phase deposition, wherein the silicon is alloyed with at least part of the current collector, and
   an electrolyte, wherein the electrolyte includes a light metallic salt having M-X bond where M represents a transition metal element or a 3B Group element, a 4B Group element, or a 5B Group element in a short-period periodic table and where X represents oxygen (O) or sulfur (S),
   at least one or more additional light metallic salts selected from the group consisting of $LiPF_6$, $LiBF_4$, $LiClO_4$, $LiAsF_6$, a lithium salt expressed by Chemical formula 11, and a lithium salt expressed by Chemical formula 12, where Chemical formulas 11 and 12 are provided as follows:

$$LiN(C_m F_{2m+1}SO_2)(C_n F_{2n+1}SO_2) \quad \text{Chemical formula 11}$$

where m and n are integer numbers ranging from 1 or greater $$LiC(C_p F_{2p+1}SO_2)(C_q F_{2q+1}SO_2)(C_r F_{2r+1}SO_2) \quad \text{Chemical formula 12}$$

where p, q, and r are integer numbers ranging from 1 or greater, and
wherein the anode active material including silicon has a thickness of approximately 4 μm or less, and
wherein the anode active material excludes a binder.

* * * * *